(12) United States Patent
Daniel

(10) Patent No.: US 6,840,862 B2
(45) Date of Patent: Jan. 11, 2005

(54) UNIVERSAL COUPLER FOR AGRICULTURE DRIVE SYSTEMS

(76) Inventor: Jeffrey K. Daniel, 7502 Mesa Rd., Houston, TX (US) 77028

( * ) Notice: Subject to any disclaimer, the term of this patent is extended or adjusted under 35 U.S.C. 154(b) by 0 days.

(21) Appl. No.: 10/325,284

(22) Filed: Dec. 20, 2002

(65) Prior Publication Data

US 2004/0121843 A1 Jun. 24, 2004

(51) Int. Cl.$^7$ ................................................. F16D 3/74
(52) U.S. Cl. ............................ 464/93; 464/98; 403/225
(58) Field of Search ............................ 464/93, 98, 99, 464/182, 901, 23; 403/1, 13, 14, 289, 290, 300–302, 309, 312, 225, 227, 373, 374.1, 374.2, 374.3; 411/539

(56) References Cited

U.S. PATENT DOCUMENTS

| | | | | |
|---|---|---|---|---|
| 548,191 A | * | 10/1895 | Griscom | ..................... 403/301 |
| 731,813 A | * | 6/1903 | Peteler | ......................... 464/93 |
| 1,201,863 A | * | 10/1916 | Oreyy | |
| 2,204,117 A | * | 6/1940 | Brammer | ................ 411/539 X |
| 3,422,637 A | * | 1/1969 | Theron | ......................... 464/93 |
| 3,994,514 A | | 11/1976 | Zimmerer et al. | |
| 4,032,245 A | * | 6/1977 | Woodruff | .................... 403/385 |
| 4,637,750 A | * | 1/1987 | Ward | ...................... 403/312 X |
| 4,673,376 A | | 6/1987 | Fender | |
| 4,747,723 A | * | 5/1988 | Hasley | ..................... 464/93 X |
| 5,678,772 A | | 10/1997 | Bettenhausen | |
| 5,906,080 A | * | 5/1999 | diGirolamo et al. | |
| 6,464,436 B1 | | 10/2002 | Davis | |

* cited by examiner

Primary Examiner—Greg Binda
(74) Attorney, Agent, or Firm—Jackson Walker L.L.P.; Mark A. Tidwell

(57) ABSTRACT

An adjustable coupler for in-line coupling of a motor drive shaft of an agricultural system with the square drive shaft of a gearbox, wherein the coupler has an adjustable clamping hub for securing around differing sizes of square drive shafts while maintaining coaxial alignment between the coupler, the square drive shaft and the motor drive shaft. The coupler is adjustable to fit different size square drive shafts, yet maintains symmetry about the center axis of the coupler, thereby reducing off-balance forces that could result in wear points and early fatigue. Contact surfaces between the coupler components are minimized to reduce the likelihood that contaminants can become entrapped between the components. The coupler is comprised of a round hub and a square hub, each attached to the opposite sides of a shock absorbing puck. The square hub is symmetrical about the axis of the puck and is formed of two axially sliding, opposing L-shaped brackets configured to clamp around the square end of a drive shaft. The round hub, also symmetrical about the axis of the puck, is spaced apart from the surface of the puck by mounting legs, while the square hub is spaced apart from the surface of the puck by spacer sleeves, thereby ensuring that the contact area between the second adjustable hub and the disk is minimized.

26 Claims, 3 Drawing Sheets

UNIVERSAL COUPLER FOR AGRICULTURE DRIVE SYSTEMS

BACKGROUND OF THE INVENTION

1. Field of the Invention

This invention relates to the field of power transmission for use in mechanized agricultural equipment, and more particularly to an adjustable coupler for coupling an in-line drive shaft to the wheel drive gearboxes that drive the wheels supporting and propelling an agricultural irrigation system.

2. Description of the Prior Art

Center pivot and linear irrigation systems are utilized to irrigate large sections of land. Typically, such systems are capable of watering a quarter section of land, i.e., 160 acres, or more. A center pivot irrigation system is an approximately one-quarter mile mechanized pipe that rotates around a fixed pivot point. When activated, the irrigation pipe rotates around the pivot, emitting liquids over the area. The length of time required for a 360-degree rotation of the irrigation pipe typically range from 12 hours up to several days. Linear irrigation systems are comprised of similar irrigation structure, but move linearly across sections of land to be irrigated, typically by wire guidance.

In conventional irrigation systems, the irrigation pipe spans are 120- to 180-foot lengths supported by a wheeled tower at each intersecting span. Sprinklers are located at spaced intervals either along the length of the span or along a water conduit parallel to the span. The wheels of each tower are normally positioned perpendicular to the span such that the system moves laterally. When constructed, wheels tracks are established to follow a prescribed path, either circular for center pivot systems or linear for linear systems. Each tower is typically provided with one or more drive motors operable to move the tower. Generally, power from the motors is transferred through a gearbox to the wheels. Most conventional systems either utilize an electric gearmotor mechanically connected between the pair of wheel drive gearboxes, or hydraulic or electric motors directly coupled to the wheel drive gearboxes. Typically, the drive motors have a round output shaft that is coupled to a square drive shaft of the wheel drive gearbox. In the agricultural industry, these square in-line drive shafts generally range from ¾" to 1" square.

As with other components of agricultural equipment, the couplers utilized to inter-connect the square drive shaft with the round output shaft are often subject to extreme operating conditions and environments. For example, common in such environments are hazards such as moisture, corrosive liquids including liquidized manure, the full range of soil and mineral conditions, insects and temperature extremes which could range from continental polar to equatorial. Likewise, because the terrain on which agricultural irrigation systems operate is often rocky, uneven and has varying surface conditions, such couplers are subject to high torque.

The standard prior art coupler consists of a rubber dampening puck sandwiched between two, two-piece collars. The dampening puck absorbs shock that could be transferred between the two collars and permits a degree of flexibility between the interconnected drive shafts. One collar is disposed to fit around the round cross-section end of the output shaft of the drive motor while the other collar is disposed to fit around the square cross-sectioned end of the drive shaft. Each collar may have a flange that permits it to be bolted or attached to the flange of the other collar, with the dampening puck disposed between the adjacent flanges. Alternatively, each collar may have teeth or similar interlocking protrusions that permit it to engage corresponding structure on the adjacent collar, again with the dampening puck clasped between the two collars. As mentioned above, the dampening puck is generally formed of rubber or other shock absorbing material such as polyurethane. The collars are generally formed of aluminum cast to fit the specific drive shaft size and shape.

One drawback to these prior art couplers is that they do not allow flexibility in the field for different drive shaft sizes. Specifically, these couplers are cast to fit around a specific size gearbox drive shaft, and are not configured to fit around drive shafts of similar shape but with different dimensions. Another drawback of the prior art couplers is their inability to handle the torque capacity of high performance drive systems. Generally, the tensile strength of aluminum is inadequate to meet the high torque applications required of such systems. Finally, these prior art couplers often erode and fail due to hazardous environment in which they are used. Abrasive materials such as sand, dirt, chemicals, etc. migrate between the aluminum collars and the puck, causing erosion of the coupling components. This problem is particularly acute in couplers where the collars have a large surface area in contact with the puck, such as those collars having a large base or flange for attachment to the puck. Those skilled in the art will understand that as the puck flexes and bends, pockets are created between the puck and flanges, enhancing the opportunity for contaminants to become trapped between components and thereby causing erosion of the components. This erosion is further exacerbated by the cyclic operation of the system and the various stresses placed on the components through operation of the equipment.

Various attempts have been made to address some of these drawbacks, the most noteworthy of which is found in U.S. Pat. No. 5,678,772. This patent teaches a universal coupler for in-line coupling drive shafts together in a motor driven irrigation system. Specifically, the coupler includes a first receptacle for mounting on the end of a motor output shaft, wherein the receptacle has an elongated base portion that attaches to a flexible, shock absorbing puck attached. Attached to the opposite side of the puck is a V-shaped cradle structure formed of elongated flat walls extending axially from said puck. This cradle also has an elongated base portion that permits the cradle to be attached to the puck in the x-axis. Furthermore, each wall has an elongated slot positioned to be perpendicular to the slot in the adjacent wall. The slots are disposed to receive an angle bolt such that when secured in the slot, the legs of the bolt and the walls of the V-shaped cradle form right angles to one another for securing about the square drive shaft of a gearbox. While the angle bolts are adjustable in the elongated slots to permit the coupler to be attached to varying size square drive shafts, a major drawback of the coupler is the lack of symmetry which results in unbalanced forces being placed on the disk, thereby leading to early failure. The V-shaped cradle is fixed in place on the puck, while only the angle bolts are adjustable. Because of this, while the round motor output shaft, puck, first receptacle and V-shaped cradle are all co-axial, the square drive-shaft mounted in the V-shaped cradle is off-center, resulting in undesirable forces generated through the puck and hardware. As mentioned above, one of the drawbacks in prior art couplers is their inadequate torque capacity for high performance systems. In addition, the V-shaped cradle is attached to the disk along only a single axis, such that any forces placed on the cradle, and hence the disk, are concentrated along the single axis, creating a concentrated bending plane through the axis.

Thus, it would be desirable to provide an adjustable coupler that minimizes off-balance forces during operation. Such a coupler should also minimize surface area contact between the components to reduce the opportunity for contaminants to erode the coupler components.

SUMMARY OF THE INVENTION

These and other objects are achieved through the universally adjustable coupler of the present invention. The coupler is adjustable to fit different size square drive shafts, yet maintains symmetry about the center axis of the coupler, thereby reducing off-balance forces that could result in wear points and early fatigue. Likewise, the contact surfaces between the coupler components is minimized to reduce the likelihood that contaminants can become entrapped between the components.

The coupler is comprised of a first hub disposed for mounting on the end of a round motor shaft. The first hub includes spaced apart legs that permit the hub to be axially mounted on dampening disk or puck on a first side, while ensuring that the contact area between the hub and disk is minimized. On the opposite side of the puck is attached a second hub assembly. The second hub assembly is symmetrical about the axis of the coupler and is adjustable to fit around square drive shafts of varying size. This hub assembly is comprised of two opposing L-shaped brackets configured to clamp around the square end of a drive shaft. Each bracket includes a clamping portion having a V-shaped notch formed therein and a flange portion extending perpendicular from the clamping portion. The flange has elongated through-slots positioned perpendicular with the clamping portion and disposed for receipt of fastening bolts used to secure the L-shaped bracket to the flexible disk. The fastening bolts extend through the flange and pass through spacer sleeves positioned between the L-shaped bracket and the disk. The spacer sleeves hold the second hub assembly off the surface of the disk to ensure that the contact area between the second adjustable hub and the disk is minimized. The elongated slots permit the L-shaped bracket to be moved radially relative to the axis of the hub. When both L-shaped brackets are attached to the puck, the opposing V-shaped notches form a symmetrical, adjustable square aperture around the axis of the puck. Each L-shaped bracket may include corresponding alignment indicators to ensure that each bracket is correctly positioned relative to the puck and axis of the coupler.

DETAILED DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
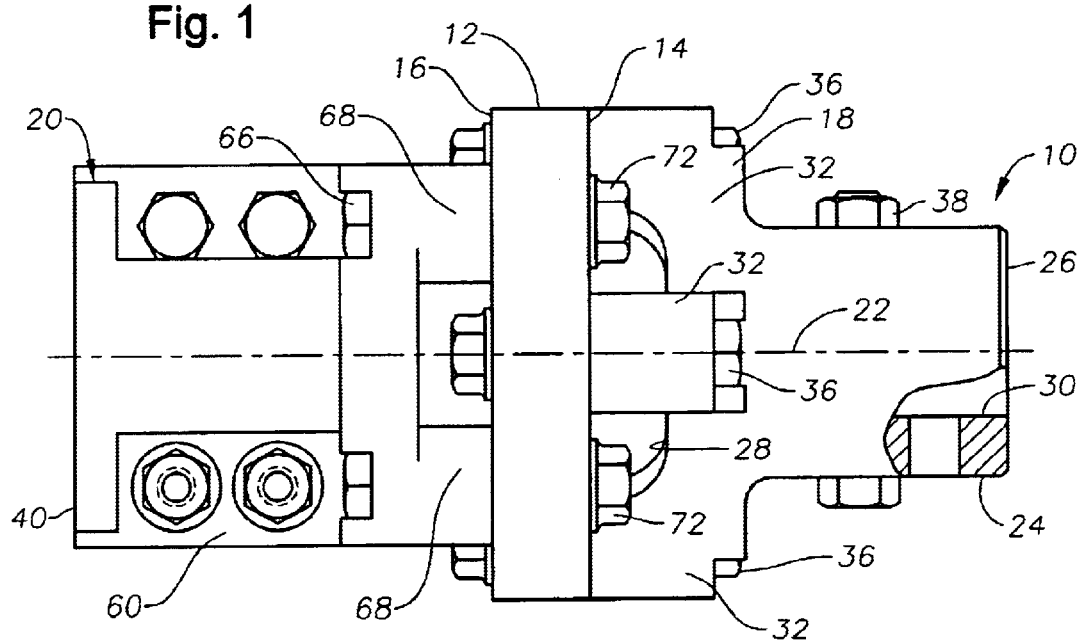
FIG. 1 is a side view of the universal coupler of the invention.
Figure 4:
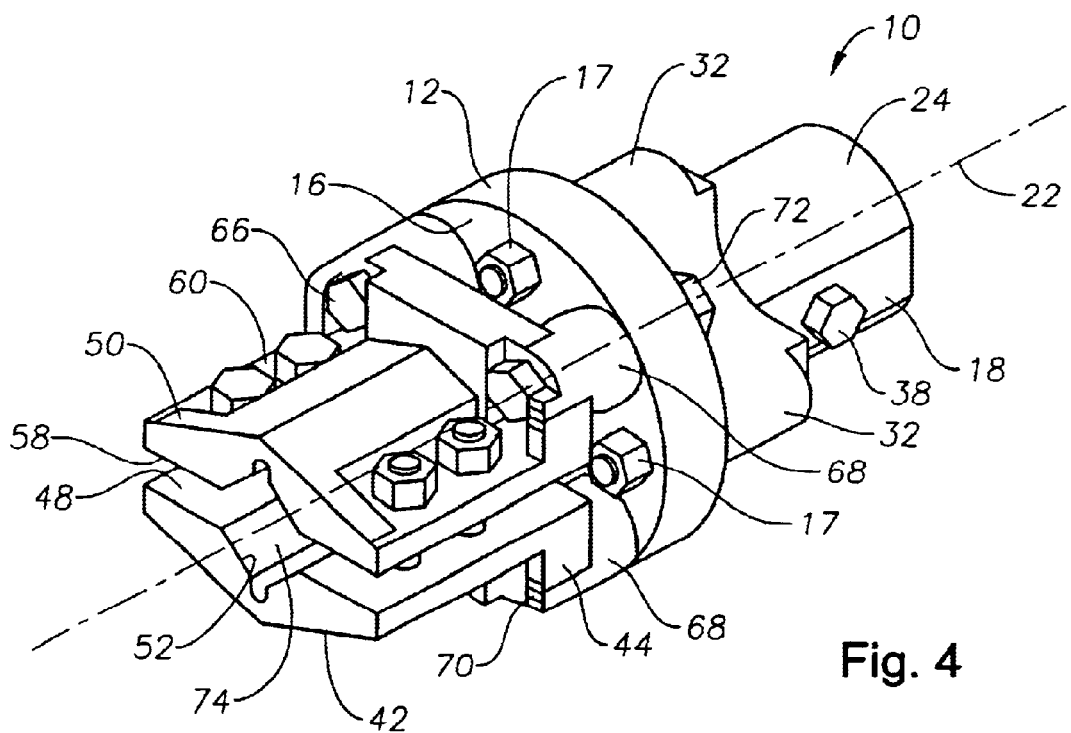
FIG. 4 is an elevation view of the universal coupler of the invention.

With reference to FIGS. 1 and 4, a universally adjustable coupler 10 is shown and is generally comprised of a dampening puck or disk 12 having a first side 14, a second side 16 and symmetrically spaced apertures 17 extending there through, wherein a round hub 18 is attached to the first side 14 of puck 12 and a square hub 20 is attached to the second side 16 of puck 12. Puck 12 may be formed of any shock absorbing material, but preferably is formed of polyurethane or an elastomer, such as rubber. Coupler 10 is characterized by a reference axis 22 extending axially through the center of puck 12.

Figure 2:
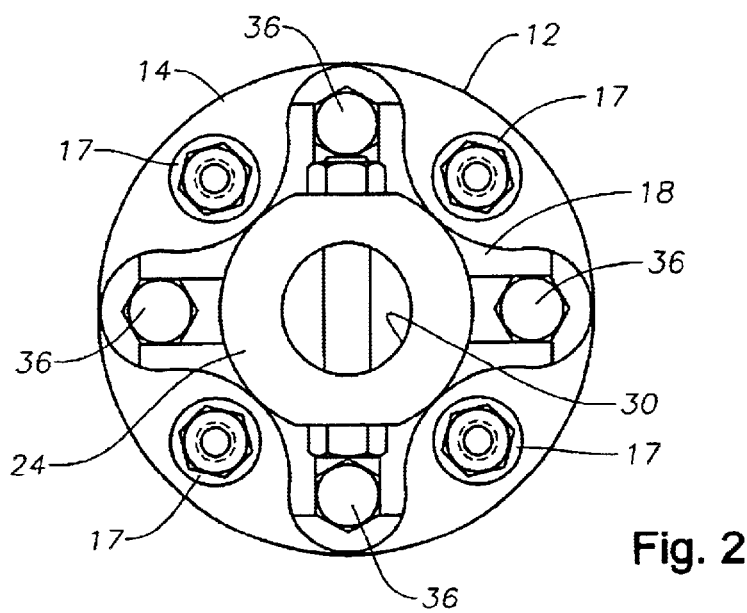
FIG. 2 is an end view of the symmetrical round hub of the coupler.
Figure 5:
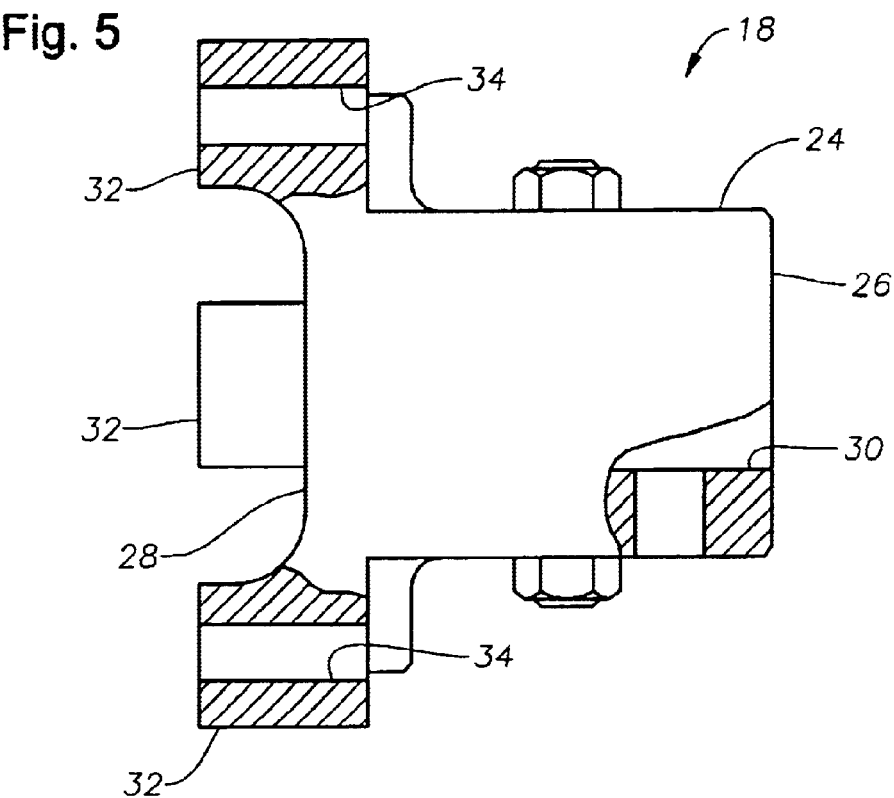
FIG. 5 is a cut-away side view of the round hub.

As more particularly shown in FIGS. 2 and 5, round hub 18 is disposed for attachment to the round shaft (not shown) of a drive motor (not shown) and includes a cylindrical sleeve 24 having a first end 26 and a second end 28. A bore 30 extends axially along sleeve 24 at said first end 26. Bore 30 may extend completely through sleeve 24 or extend only partially through sleeve 24. Attached to the second end 28 of sleeve 24 are a plurality of mounting legs or projections 32. In one preferred embodiment, legs 32 extend axially out from sleeve 24, permitting a mounting aperture 34 to be provided through each leg. Although two legs will suffice for the purposes of the invention, preferably at least three legs are utilized. Those skilled in the art will understand that with at least three legs, a radial bending plane between two legs is avoided, thereby enhancing symmetry about reference axis 22 and more evenly spreading bending and torsional forces across puck 12.

In any event, preferably, legs 32 also extend away from second end 28 of sleeve 24 so that round hub 18 is spaced apart from puck 12 when mounted thereon. Fasteners 36 extend through apertures 34 of sleeve 24 and apertures 17 of puck 12 in order to attach round hub 18 to first side 14 of puck 12. A fastener 38 may also be provided in the first end 28 of sleeve 24 to permit hub 10 to be secured to the round motor shaft.

Figure 3:
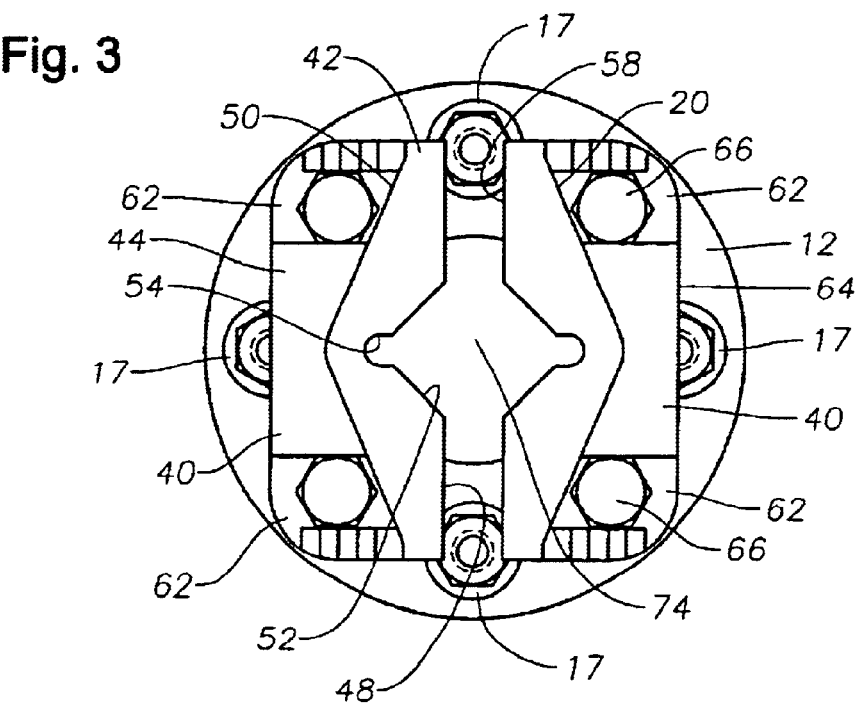
FIG. 3 is an end view of the symmetrical, adjustable square hub of the invention.
Figure 6:
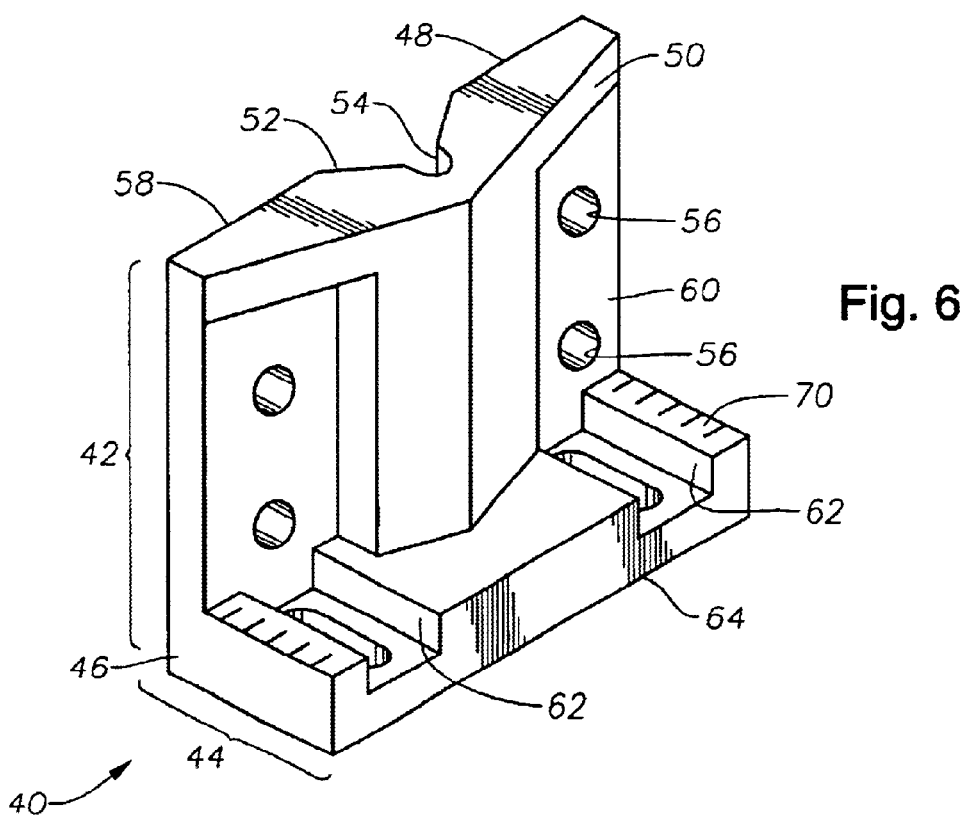
FIG. 6 is an elevation view of and L-shaped bracket of the square hub.

Turning to FIGS. 3,4 and 6, square hub 20 is shown as comprising two opposing L-shaped brackets 40 configured to clamp around the square end of a drive shaft (not shown). Each L-shaped bracket 40 is defined by a clamping portion 42 and a flange portion 44. Clamping portion 42 is characterized by a first side 48 and a second side 50. First side 48 includes an axially extending, V-shaped notch 52 defined therein. A groove 54 runs along the base of notch 52. Preferably, V-shaped notch 52 forms a 90° angle between adjacent notch surfaces. Fastener apertures 56 are provided in clamping portion 42 of bracket 40 and extend from the first side 48 to the second side 50. First side 48 may also include flat portion 58 defined thereon. Likewise, second side 50 may include a flat portion 60 at the point where apertures 56 are defined.

Flange portion 44 extends perpendicularly out from the second side 50 of clamping portion 42 at the base 46 of clamping portion b 42. Flange portion 44 includes elongated through-slots 62 extending from the outer edge 64 of flange portion 44 to the base 46 of clamping portion 42. In the preferred embodiment, through-slots 62 are parallel to one another. Slots 62 are disposed for receipt of standard fastening bolts 66 used to secure square hub 20 to the second side 16 of puck 12. In one preferred embodiment, the width and depth of each slot 62 is sized to create a recess in flange portion 44 to permit the head of bolts 66 to slide lengthwise along the slot while constraining the fastener from rotating within the slot. Flange portion 44 may also include alignment indicators 70.

As best illustrated in FIG. 4, fastening bolt 66 extends through slot 62, through spacer sleeve 68 and through an aperture 17 in puck 12 and is engaged by nut 72 adjacent first side 14 of puck 12. Spacer sleeves 68 are positioned so that square hub 20 is spaced apart from puck 12 when mounted thereon, thereby minimizing the contact surface area between square hub 20 and puck 12.

Square hub 20 is thus attached to puck 12 so as to be symmetrical about reference axis 22. When both L-shaped brackets 40 are attached to the puck 12, the opposing V-shaped notches 52 form a symmetrical, adjustable, elongated square aperture-74 around reference axis 22. The elongated slots 62 permit the L-shaped brackets 40 to be moved radially relative to puck 12 in and out from axis 22, thus changing the size of square aperture 74 and permitting square hub 20 to be adjusted to fit around square drive shafts of varying size. Since both L-shaped brackets 40 are adjustable in this way, it is possible to ensure that the axis of the elongated square aperture 74, and thus the axis of the square drive shaft, is always coaxial with reference axis 22, and hence, the axis of the round motor shaft. The alignment indicators 70 can be used to verify that each L-shaped bracket 40 is positioned equidistance from reference axis 22, thereby maintaining symmetry and ensuring that coupler 10 properly aligns the round motor shaft with the square drive shaft. Grooves 54 ensure that the end of a square drive shaft will fit tightly within V-shaped notches 52 without interference. Furthermore, in one preferred embodiment, the surface configuration of first side 48 of L-shaped bracket 40 as shown in FIG. 4 permits a greater range of square drive shaft sizes to be ingaged by square hub 20. Specifically, by providing a flat portion 58 on either side of the V shaped notch 52 on each L-shaped bracket 40, the brackets 40 have a greater range of adjustment since the surfaces do not interfere with each other, thereby permitting the square hub 20 to accommodate a greater range of shaft sizes. Of course, those skilled in the art will understand that V-shaped notches are not required at all since the flat portions 50 of L-shaped brackets 40 can clamp against the flat sides of a square drive shaft. However, V-shaped notches 52 reduce the likelihood that a square drive shaft may become loose between the two L-shaped brackets 40. Likewise, while a single slot 62 may be utilized on the L-shaped bracket 40 to permit positional adjustment, use of two slots 62 as described in the perferred embodiment constrains the L-shaped bracket 40 to axial movement on puck 12 and prevents a bending force from being created in a single plane between the opposing L-shaped brackets 40. Finally, the flat portion 60 on second side 50 of L-shaped bracket 40 permits the fasteners to be tightened more secuerly against L-shaped bracket 40, thereby ensuring that square hub 20 is tightly secured around the square drive shaft.

The above described coupler is thus easily adjustable to fit around varying sizes of square drive shafts commonly found in agricultural irrigation systems. Since the clamping brackets of the adjustable square hub mirror one another on the shock absorbing puck, they can be adjusted to ensure that the axis of the square drive shaft is always co-axial with the axis of the coupler and round drive shaft, no matter what the size of the square hub, thereby avoiding the balance and alignment drawbacks of the prior art. Furthermore, since the actual hubs themselves are spaced apart from the flexible puck, the ability of contaminants to insert themselves between the puck and the hubs is reduced, thereby minimizing erosion and extending the working life of the coupler. In this same vein, the symmetry of the coupler about the x-axis and the y-axis, in addition to ensuring that the drive shafts are properly aligned, also helps distribute the various forces placed on the coupler across the entire surface of the puck, reducing wear points that can cause early failure of a coupler.

While certain features and embodiments of the invention have been described in detail herein, it will be readily understood that the invention encompasses all modifications and enhancements within the scope and spirit of the following claims.

What is claimed is:

1. In a motor driven agricultural system having first and second shafts, said second shaft having a rectilinear cross-section, a coupler for in-line coupling said shafts together, said coupler comprising:
    A. a shock absorbing puck having a first side and a second side;
    B. a first hub attached to the first side of the puck;
    C. a second hub attached to the second side of the puck, the second hub comprising two opposing, radially sliding L-shaped brackets, each bracket including a clamping surface and a flange portion, wherein an elongated through slot is defined in said flange portion to permit the bracket to be attached to said puck; and
    D. a fastener extending through the slot of each bracket, securing each bracket to the puck;
    E. wherein each slot permits the corresponding bracket to move radially on said disk.

2. The coupler of claim 1, wherein said puck is formed of an elastomeric material.

3. The coupler of claim 1, wherein said puck is formed of polyurethane.

4. The coupler of claim 1, wherein said first hub further comprises a cylindrical sleeve having a first end and a second end, a bore extending axially along said sleeve from said first end, and at least three mounting legs attached to the second end of said cylindrical sleeve, said legs extending axially out from said sleeve and away from the second end of said sleeve.

5. The coupler of claim 4, wherein at least one leg is provided with a mounting aperture there-through and said coupler further comprises a fastener extending through said mounting aperture and securing said first hub to said puck.

6. The coupler of claim 1, wherein said first hub is attached to said puck at least three points.

7. The coupler of claim 6 wherein said three attachment points are symmetrical about said reference axis.

8. The coupler of claim 1, wherein the clamping surface of said second hub has an axially extending, V-shaped notch defined therein.

9. The coupler of claim 8, where a groove extends along the base of said V-shaped notch.

10. The coupler of claim 8 wherein said V-shaped notch forms a 90° angle between adjacent surfaces forming said notch.

11. The coupler of claim 1, wherein said flange portion extends substantially perpendicular to said clamping surface.

12. The coupler of claim 1, wherein each L-shaped bracket includes two elongated through-slots, said through-slots being substantially parallel.

13. The coupler of claim 1 further comprising a spacer sleeve disposed adjacent each slot, between the flange portion of said L-shaped bracket and the second side of said puck.

14. The coupler of claim 1 further comprising an alignment indicator to indicate the location of an L-shaped bracket relative to said puck.

15. In a motor driven agricultural system having first and second shafts, said second shaft having a rectilinear cross-section, a coupler for in-line coupling said shafts together, said coupler comprising:

A. a dampening puck having a first side, a second side, and apertures extending there through, wherein said coupler is characterized by a reference axis extending axially through the center of said puck;

B. a round hub attached to the first side of said puck, said round hub comprising a cylindrical sleeve having a first end and a second end, a bore extending axially along said sleeve from said first end, and at least two mounting extensions attached to the second end of said cylindrical sleeve;

C. a square hub attached to the second side of said puck, said square hub comprising two opposing L-shaped brackets, each L-shaped bracket having a clamping portion and a flange portion, wherein said clamping portion has a first side and a second side, with an axially extending, V-shaped notch defined in the first side, and wherein said flange portion extends perpendicularly out from the second side of said clamping portion, said flange further having two substantially parallel, elongated through-slots extending from an outer edge of said flange portion to the base of said clamping portion;

D. a spacer sleeve disposed adjacent each slot, between the flange portion of said L-shaped bracket and the second side of said puck; and E. a fastener seated in each of said slots and extending through the adjacent spacer sleeve;

F. wherein each of said L-shaped brackets is constrained to move axially relative to said puck towards and away from said reference axis.

16. The coupler of claim 15, wherein said apertures in said puck are symmetrically spaced about said reference axis.

17. The coupler of claim 15, wherein said mounting extensions are legs.

18. The coupler of claim 17, wherein said legs extend axially out from said cylindrical sleeve of said round hub.

19. The coupler of claim 17, wherein said legs extend away from the second end of said cylindrical sleeve of said round hub so that said cylindrical sleeve is spaced apart from said puck when mounted thereon.

20. The coupler of claim 15 comprising at least three mounting extensions.

21. The coupler of claim 15 further comprising a groove extending along the base of said V-shaped notch.

22. The coupler of claim 15 wherein said V-shaped notch forms a 90° angle between adjacent surfaces forming said notch.

23. The coupler of claim 15 further comprising an alignment indicator to indicate the location of an L-shaped bracket relative to said puck.

24. The coupler of claim 15 wherein said square hub is symmetrical about the reference axis.

25. The coupler of claim 15, wherein said V-shaped notches are opposing one another in their adjacent L-shaped brackets so as to form a symmetrical, elongated square aperture around reference axis.

26. In a motor driven agricultural system having first and second shafts, said second shaft having a rectilinear cross-section, a coupler for in-line coupling said shafts together, said coupler comprising:

A. a shock absorbing puck having a first side and a second side;

B. a first hub attached to the first side of the puck;

C. a second hub attached to the second side of the puck, the second hub comprising two opposing, radially sliding L-shaped brackets, each bracket including a clamping surface and a flange portion, wherein an elongated through slot is defined in said flange portion to permit the bracket to be attached to said puck, said through slot being recessed in said flange portion; and D. a fastener partially secured by said recess and extending through the slot of each bracket, said fastener securing each bracket to the puck;

E. wherein each slot permits the corresponding bracket to move radially on said disk.

* * * * *